United States Patent

[11] 3,621,056

[72] Inventors William J. Houlihan;
 Robert E. Manning, both of Mountain Lakes, N.J.
[21] Appl. No. 753,068
[22] Filed Aug. 16, 1968
[45] Patented Nov. 16, 1971
[73] Assignee Sandoz-Wander, Inc.
 Hanover, N.J.

[54] SUBSTITUTED BENZYLIDENEAMINO GUANIDINES
 2 Claims, No Drawings
[52] U.S. Cl. .................................................. 260/545 R,
 260/552 SC, 260/564 E, 260/564 F, 424/317
[51] Int. Cl. .................................................. C07c 109/18
[50] Field of Search ........................................ 260/545

[56] References Cited
 UNITED STATES PATENTS
 3,257,382 6/1966 Bell .............................. 260/239.3

Primary Examiner—Lewis Gotts
Assistant Examiner—Robert Gerstl
Attorneys—Gerald D. Sharkin, Frederick H. Weinfeldt, Robert S. Honor, Walter F. Jewell and Richard E. Vila ABSTRACT: Benzylideneamino guanidines substituted with lower alkanoyl groups, e.g., 1-(2,6-dichlorobenzylideneamino)-3-acetoxy-2,3-diacetylguanidine, are useful as hypotensives.

SUBSTITUTED BENZYLIDENEAMINO GUANIDINES

This invention relates to benzylideneamino guanidines, and to methods for their preparation.

The substituted benzylideneamino guanidines of this invention may be represented by the following structural formula:

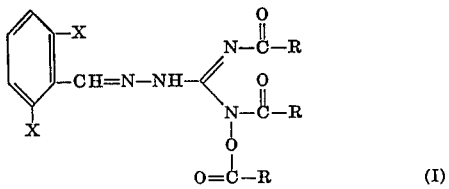

where each X, independently, represents halo having an atomic weight of about 19–36 and R represents a straight chain lower alkyl group, i.e., alkyl of 1 to 3 carbon atoms, i.e., methyl, ethyl or propyl. The compound of formula (I) which is 1-(2,6-dichlorobenzylideneamino)-3-acetoxy-2,3-diacetyl-guanidine represents a preferred aspect of this invention.

The compounds of formula (I) may be prepared by treating an appropriate 1-(2,6-di halo benzylideneamino)-3-hydroxy guanidine (II)

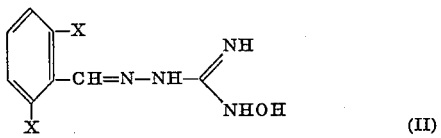

or an acid addition salt thereof where X is as previously defined with a lower alkanoic acid anhydride of the formula

where R is as earlier defined at a temperature of about 10°–50° C., preferably 15°–30° C. Solvent is not necessary and excess reactant, e.g., acetic anhydride, may be utilized. The particular temperature employed is not critical in obtaining the compounds (I), and they may be recovered using conventional techniques.

The compounds of formula (II) may be prepared by treating an appropriate 2,6-dihalobenzaldehyde S-loweralkylisothiosemicarbazone (IV) with hydroxylamine (the latter preferably as an acid addition salt, e.g., a hydrohalide such as the hydrochloride). The reaction may be represented as follows:

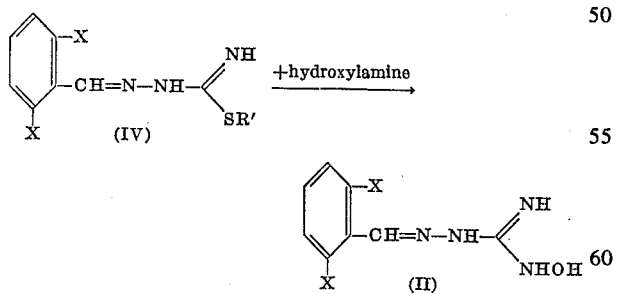

where X is as previously defined and R' represents loweralkyl, i.e., alkyl having 1 to 4 carbon atoms such as methyl, ethyl, isopropyl and the like.

The isothiosemicarbazone (IV) is treated with the hydroxylamine in a solvent which dissolves both reactants, such as water in admixture with a loweralkanol, e.g., methanol or ethanol, or a tetrahydrofuran-water mixture, and the like. The reaction may be carried out preferably at a temperature of about 20°–50° C.

The S-loweralkylisothiosemicarbazones (IV) are prepared by treating a 2,6-dihalobenzaldehydethiosemicarbazone of the formula

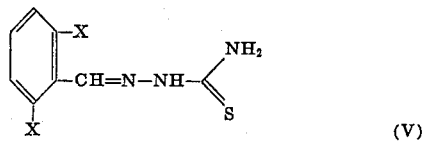

where X is as earlier defined, in solvent such as loweralkanols with a loweralkyl halide, such as methyl iodide, preferably from about 50°–80° C.

Certain of the compounds (V) are known and may be prepared by methods disclosed in the literature. Those thiosemicarbazones (V) not specifically disclosed may be prepared by analogous methods from known materials.

The compounds represented by formula (I) above are useful because they possess pharmaceutical properties in animals. In particular, these compounds are useful as hypotensives, as indicated by their activity in anesthetized cat given 0.1–1.0 mg./kg. i.v. of active material and tested by blood-pressure measurement using a mercury manometer or transducer via a catheter inserted in the carotid or femoral artery. When so utilized, the compounds may be combined with one or more pharmaceutically acceptable carriers or adjuvants. They may be administered orally or parenterally and, depending upon the compound employed and the mode of administration, the exact dosage utilized may vary.

In general, satisfactory results are obtained when these compounds are administered at a daily dosage of about 0.02 milligrams to about 30 milligrams per kilogram of animal body weight. This daily dosage is preferably administered two to four times a day, or in sustained release form. For most large mammals such as primates, the total daily dosage is from about 0.2 milligrams to about 120 milligrams. Dosage forms suitable for internal use comprise from about 0.05 milligrams to about 60 milligrams of the active compound in intimate admixture with a solid or liquid pharmaceutically acceptable carrier or diluent.

A representative formulation suitable for oral administration is a tablet prepared by standard tabletting techniques which contains the following:

| Ingredient | Parts by Weight |
| --- | --- |
| 1-(2, 6-dichlorobenzylideneamino)-3-acetoxy-2,3-diacetylguanidiene | 10 |
| tragacanth | 2 |
| lactose | 79.5 |
| corn starch | 5 |
| talcum | 3 |
| magnesium stearate | 0.5 |

The following example is provided for the purpose of illustration and not by way of limitation. It is not intended so as to limit the scope of the invention as defined in the appended claims.

EXAMPLE 1-(2,6-dichlorobenzylideneamino)-3-acetoxy-2,3-diacetylguanidine

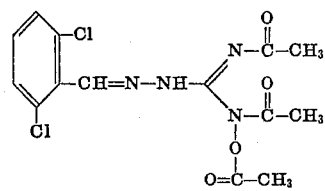

A solution of 1-(2,6-dichlorobenzylideneamino)-3-hydroxy-guanidine (1.0g.) in 10 ml. of acetic anhydride is allowed to stand overnight. The resultant crystals (600 mg.) are collected by filtration. Recrystallization from methylene chloride-ether (1:1) gives 500 mg. 1-(2,6-dichlorobenzylideneamino)-3-acetoxy-2,3-diacetylguanidine; m.p. 138°–141° C.

What is claimed is:
1. A compound of the formula

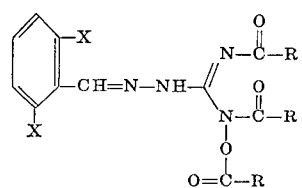
where each X, independently, represents halo having an atomic weight of about 19–36, and R represents straight chain lower alkyl.
2. The compound according to claim 1 wherein each X is chloro and each R is methyl.
* * * * *